(12) United States Patent
Kinoshita et al.

(10) Patent No.: US 6,185,499 B1
(45) Date of Patent: Feb. 6, 2001

(54) CRUISE CONTROL SYSTEM FOR MOTOR VEHICLE

(75) Inventors: Masahiro Kinoshita; Kazuhiro Fukamachi, both of Mitaka (JP)

(73) Assignee: Fuji Jukogyo Kabushiki Kaisha, Tokyo (JP)

(*) Notice: Under 35 U.S.C. 154(b), the term of this patent shall be extended for 0 days.

(21) Appl. No.: 09/127,509

(22) Filed: Jul. 31, 1998

(30) Foreign Application Priority Data

Aug. 11, 1997 (JP) .................................................. 9-216553

(51) Int. Cl.$^7$ .............................. B60T 8/58; B60K 41/20
(52) U.S. Cl. .............................. 701/96; 701/93; 701/301; 342/455; 340/903; 180/179
(58) Field of Search .............................. 701/93, 96, 97, 701/98, 300, 301; 180/167–169, 176–179; 123/350, 352; 342/109, 454, 455; 340/901–904

(56) References Cited

U.S. PATENT DOCUMENTS

| | | | |
|---|---|---|---|
| 5,215,159 | * | 6/1993 | Nishida .................... 180/179 |
| 5,400,864 | * | 3/1995 | Winner et al. .............. 701/96 |
| 5,493,302 | * | 2/1996 | Woll et al. ................ 342/109 |
| 5,594,645 | * | 1/1997 | Nishimura et al. ........... 701/96 |
| 5,708,584 | * | 1/1998 | Doi et al. .................. 340/903 |
| 5,771,007 | * | 6/1998 | Arai et al. ................ 701/96 |
| 5,781,103 | * | 7/1998 | Gilling ................... 701/96 |
| 5,938,714 | * | 8/1999 | Satonaka ................... 701/96 |

FOREIGN PATENT DOCUMENTS 4-260836  9/1992 (JP).

* cited by examiner

Primary Examiner—Gary Chin
(74) Attorney, Agent, or Firm—Martin A. Farber (57) ABSTRACT

A preceding vehicle, an inter-vehicle distance between a self vehicle and the preceding vehicle, vehicle speeds of the self vehicle and the preceding vehicle, an operation of a cruise control, a braking operation, a brake pressure and the like are detected and inputted to a cruise control unit. Based on these input signals, the cruise control system selects a constant speed running mode when the inter-vehicle distance is larger than a specified value and selects a following-behind running mode when the inter-vehicle distance is smaller than the specified value. When the constant speed mode is selected, the vehicle travels at a constant preset vehicle speed by operating a throttle actuator and a brake actuator. Further, when the following-behind running mode is selected, the vehicle travels keeping the inter-vehicle distance at a specified distance by the operation of the throttle actuator and the brake actuator. If the following-behind running mode lasts longer than a specified time, the preset vehicle speed is updated into a vehicle speed higher than an average vehicle speed within the specified time. Further, when a braking operation is detected during the following-behind running mode, if the brake pressure is lower than a specified value and the vehicle speed is higher than a predetermined lower limit vehicle speed, the cruise control is restored when the braking operation finishes.

15 Claims, 8 Drawing Sheets

CRUISE CONTROL SYSTEM FOR MOTOR VEHICLE

BACKGROUND OF THE INVENTION

1. Field of the Invention

The present invention is related to a cruise control system for a motor vehicle and more particularly to a cruise control system having an automatic restoration function when brakes are applied.

2. Discussion of the Prior Arts

In a tendency of increasing number of traffic accidents, it has been no longer adequate merely to enhance the safety of vehicles themselves. One aspect for decreasing car accidents is to prevent vehicles from falling into hazardous situations, that is, a so-called ADA system (Active Drive Assist System) for positively assisting drivers' safe driving has been developed in universities, institutes, automobile manufacturers and the like.

One example of such ADA system includes a monitoring camera mounted on a vehicle for recognizing road situations, obstacles, traffic environments and other information and based on these information the system raises alarm for urging a driver to apply operations to the vehicle so as to avoid hazard. If the driver does not notice the alarm or neglects it, temporary drive assisting means are taken in such away that brake is automatically applied or a steering wheel is operated automatically on the safe side.

Further, the ADA system, since it can detect a vehicle speed of a preceding vehicle, an inter-vehicle distance, a relative vehicle speed and the like, has a capability of following behind the preceding (tentatively, referred to as a following-behind control) while a safe inter-vehicle distance is retained between the subject vehicle and the preceding vehicle. The ADA system combined with a cruise control system can perform a constant speed control when the preceding vehicle does not exist or exists far away from the vehicle. When a preceding vehicle travels nearby, the cruise control system is switched to the following-behind control as described above so as to follow the preceding vehicle from behind.

Generally, the cruise control system is released automatically when applying brakes, in order to prevent the throttle opening angle from increasing inversely during deceleration by braking operation. Therefore, in case where a driver desires to restore the cruise control after braking operation, he must switch the cruise control ON again. When this automatic release of the cruise control is applied to the following-behind control, there occurs a following problem.

When the subject vehicle catches up with the preceding vehicle and the vehicle transfers into the following-behind control, the cruise control system operates to reduce the vehicle speed by decreasing the throttle opening angle. In this case, in order to hasten the transference into the following-behind control, when the driver applies brake during this transfer process to the following-behind control, not only the cruise control but also the following-behind control is released. As a result, the driver must switch the cruise control ON again and this provides the driver with much inconvenience.

Further, after the cruise control changes into the following-behind control, when the preceding vehicle goes out of the monitoring range, the vehicle returns to the cruise control. At this moment, if the preset or target vehicle speed stays in a relatively high value, the vehicle starts a steep acceleration so as to try to restore the preset vehicle speed. This type of the cruise control system is undesirable in terms of drive feeling and should be improved in view of safety.

With respect to the following-behind control as described above, Japanese Patent Application Laid-open No. Toku-Kai-Hei 4-260836 discloses a technique in which the following-behind control is performed automatically according to the inter-vehicle distance between the self vehicle and the preceding vehicle and, when the variation of vehicle speeds of the self vehicle is small, the following-behind control is changed over into the constant speed control, whereby drive feeling can be prevented from being exacerbated.

However, this prior art has a problem in that once a brake is applied during the constant speed control, the cruise control system is canceled, and also a problem of the above mentioned steep acceleration when restoring the preset vehicle speed.

SUMMARY OF THE INVENTION

With the above described problems in mind, it is an object of the present invention to provide a cruise control system having both functions, a constant speed running control and a following-behind control and capable of restoring the cruise control when the braking operation finishes. It is another object of the present invention to provide a cruise control system capable of preventing a sudden acceleration when the following-behind control is changed over into the constant speed control.

In order to achieve these objects, the present invention comprises a safe inter-vehicle distance calculating means for calculating a safe inter-vehicle distance based on vehicle speeds of a self vehicle and a preceding vehicle, a constant speed running mode selecting means for selecting a constant speed running mode wherein the vehicle speed of the self vehicle is held at a set vehicle speed, when the inter-vehicle distance is larger than the safe inter-vehicle distance, a following-behind running mode selecting means for selecting a following-behind running mode wherein the inter-vehicle distance is held at a predetermined value, when the inter-vehicle distance is smaller than the safe inter-vehicle distance, a vehicle speed updating means, when the following-behind running mode lasts longer than a specified time, for updating the set vehicle speed into a vehicle speed around an average vehicle speed within the specified time, and a cruise control restoring means, when a braking operation is finished, for restoring an operation of the cruise control system stopped by the braking operation during running at the following-behind running mode, if the brake pressure is lower than a specified value and if the vehicle speed of the self vehicle is higher than a lower limit vehicle speed.

DETAILED DESCRIPTION OF THE PREFERRED EMBODIMENT

Figure 2:
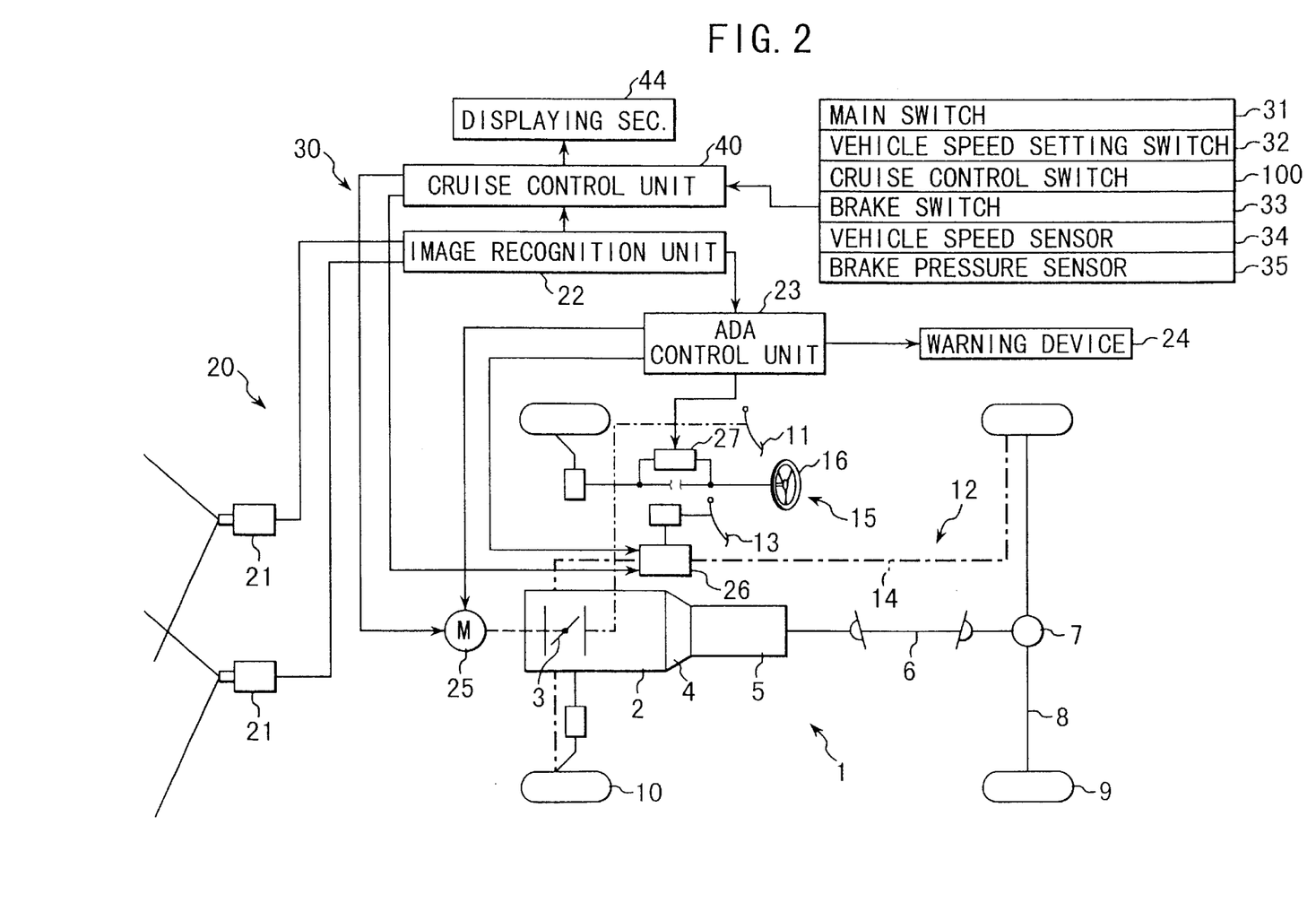
FIG. 2 is a schematic diagram showing a vehicle equipped with an ADA system and a cruise control system according to the present invention.

Referring now to FIG. 2, a vehicle 1 includes an engine 2 which drives rear wheels 9 through a clutch 4, a transmission 5, a propeller shaft 6, a differential 7 and axle shafts 8. A vehicle control system of the vehicle 1 comprises an accelerator pedal 11 for opening and closing a throttle valve 3 so as to change engine power, a brake system 12 which includes a brake pedal 13, a brake pipe 14, wheel cylinders (not shown) of front and rear wheels 9 and 10, and a steering system 15 which includes a steering wheel 16 to steer the front wheels 10.

An ADA system 20 comprises an image recognition unit 22 connected with two CCD (Charge Coupled Device) cameras 21, an ADA control unit 23, a warning device 24, a throttle actuator 25, a brake actuator 26 and a steering actuator 27.

The two CCD cameras 21 are disposed at the front of the vehicle being arranged in a horizontally aligned relation at a prescribed interval away from each other so as to take stereoscopic pictures of scenery and objects. The image recognition unit 22 serves as calculating three-dimensional positions of scenery and objects through the processing of image signals taken by the CCD cameras 21 and obtaining, based on distance distribution information with respect to three-dimensional coordinates of scenery and objects, the configuration of roads, the distance between the self vehicle and the objects, a vehicle speed $V_2$ of the preceding vehicle, an inter-vehicle distance L between the self vehicle and the preceding vehicle, and the like.

The ADA control unit 23 serves as estimating a likelihood of a lane moving-out, a rear-end collision, a contact with obstacles and the like based on distance data or vehicle speed data outputted from the image recognition unit 22 and informing, if there is such a likelihood, a driver of impending danger by means of issuing an alarm with the warning device 24.

Further, if it is judged that the driver have taken no proper action to avoid danger, the ADA control unit 23 outputs one or more of following signals to avoid danger: outputting a throttle signal to the throttle actuator 25 to open or close a throttle valve 3 to vary the engine power forcedly, outputting a brake signal to the brake actuator 26 to apply brake, and outputting a steering signal to the steering actuator 27 to steer the vehicle on the safe side.

A cruise control apparatus 30 constituted in combination with the ADA system 20 comprises a main switch 31, a speed set switch 32, a cruise control switch 100, a brake switch 33 forming a braking operation detecting means for detecting a braking operation by the driver, a vehicle speed sensor 34 forming a vehicle speed detecting means for detecting a vehicle speed $V_1$ of the self vehicle, a brake pressure sensor 35 forming a brake pressure detecting means for detecting a brake pressure $P_b$, and a cruise control unit 40 forming a control means for outputting control signals to a display 44 and an acceleration and deceleration means such as the throttle actuator 25 and the brake actuator 26.

Further, the CCD cameras 21 in common use with the ADA system and the image recognition unit 22 act as an inter-vehicle distance detecting means for detecting an inter-vehicle distance L between the self vehicle and the preceding vehicle.

Figure 1:
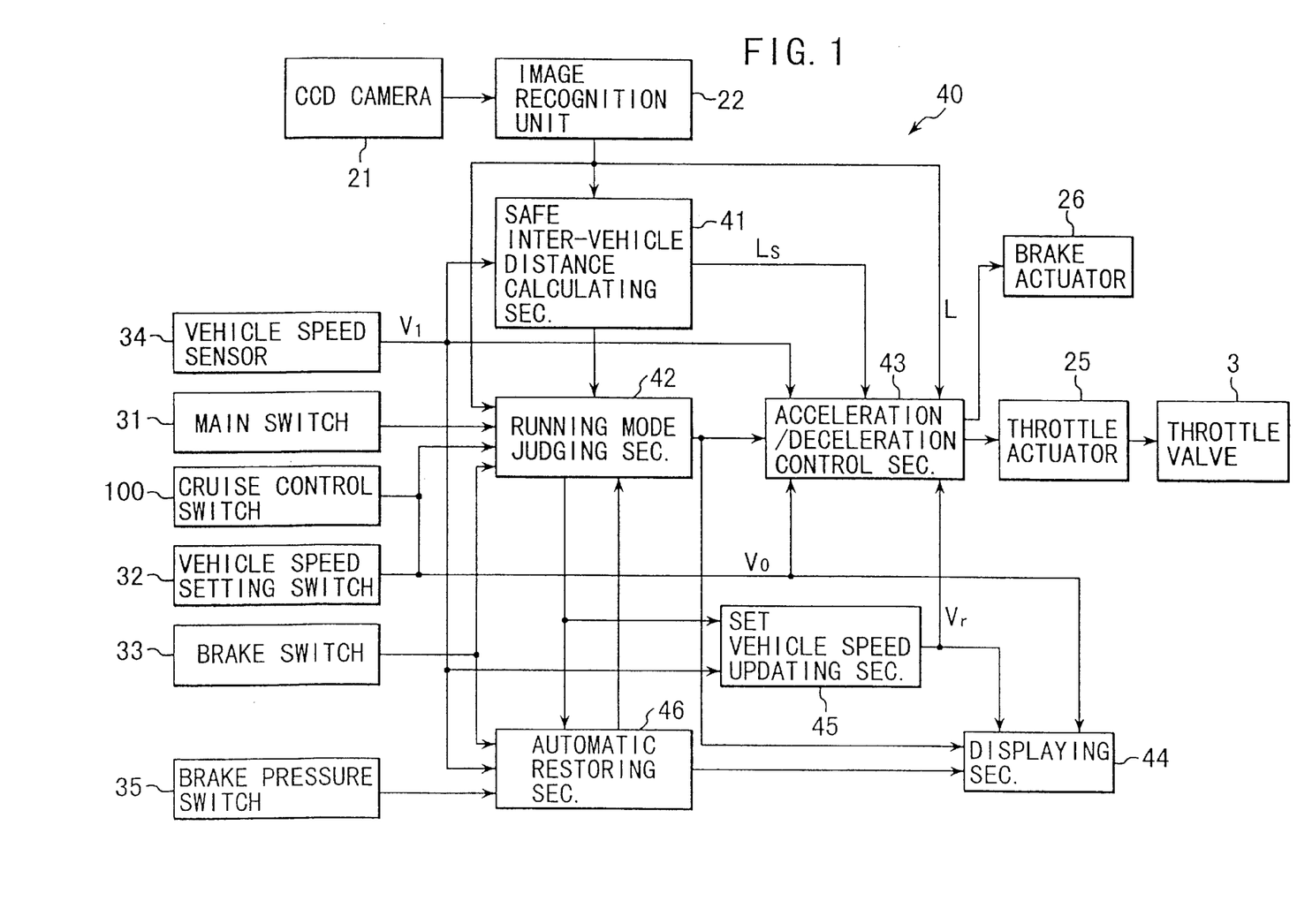
FIG. 1 is a functional block diagram of a cruise control system combined with an ADA system according to the present invention.

Describing the function of the cruise control unit 40 with reference to FIG. 1, the cruise control unit 40 includes a safe inter-vehicle distance calculating section 41 in which a safe inter-vehicle distance $L_s$ is calculated, based on the vehicle speed $V_1$ detected by the vehicle speed sensor 34 and the image data from the image recognition unit 22, according to the following equation:

$$L_s = V_1^2/(2 \cdot G_0) - V_2^2/(2 \cdot G_2) + L_m$$

where $V_1$ is a vehicle speed of the self vehicle; $V_2$ is a vehicle speed of the preceding vehicle; $G_0$ is a maximum deceleration capable of being generated from the cruise control apparatus; $G_2$ is an estimated deceleration of the preceding vehicle at emergency braking; and $L_m$ is a margin taken with respect to the safe inter-vehicle distance $L_s$.

Further, the cruise control unit 40 includes a running mode judging section 42 to which signals from the main switch 31, those from the vehicle speed setting switch 32, those from the cruise control setting switch 100, those from the brake switch 33, the safe inter-vehicle distance $L_s$ from the safe inter-vehicle distance calculating section 41 and the actual inter-vehicle distance L from the image recognition unit 22, are inputted, respectively.

The running mode judging section 42 judges whether or not the cruise control is operated by the ON/OFF condition of the main switch 31, the vehicle speed setting switch 32 or the cruise control setting switch 100 and further judges whether, if the cruise control is operated, the running mode is a constant speed running mode or a following-behind running mode. That is, in case where there is no preceding vehicle or the actual inter-vehicle distance L is larger than the safe inter-vehicle distance $L_s$ (namely, larger than a specified value), the running mode is judged to be a constant speed running mode.

On the other hand, in case where the actual inter-vehicle distance L is smaller than the safe inter-vehicle distance $L_s$ (smaller than the specified value), the running mode is judged to be a following-behind running mode. The mode signal which is the result of the judgment is inputted to an acceleration/deceleration control section 43.

When the driver applies brakes, the running mode judging section 42 judges responsive to a signal from the brake switch 33 that the braking operation has been performed and releases the operation of the cruise control automatically. In this case, the cruise control is inoperative without driver's OFF operation.

When the vehicle travels in the constant speed running mode, the acceleration/deceleration control section 43 compares a set vehicle speed $V_0$ in the vehicle speed setting switch 32 with the present vehicle speed $V_1$ and, if $V_0$ is larger than $V_1$, outputs a signal to increase the opening angle of the throttle valve 3 to the throttle actuator 25 for accelerating the vehicle. If $V_0$ is smaller than $V_1$, a signal to reduce the opening angle of the throttle valve 3 is outputted to the throttle actuator 25 for deceleration. Further, if necessary, a signal is outputted to the brake actuator 26 so as to apply brake pressure for deceleration. Thus, the vehicle speed $V_1$ is maintained at the set vehicle speed $V_0$ by changing engine power electrically or applying brakes automatically, if needed.

When the vehicle travels in the following-behind mode, the acceleration/deceleration control section 43 compares the actual inter-vehicle distance L with the safe inter-vehicle distance $L_s$ and, if L is larger than $L_s$, outputs a signal to increase the opening angle of the throttle valve 3 to the throttle actuator 25 for accelerating the vehicle. If L is smaller than $L_s$, a signal to reduce the opening angle of the throttle valve 3 is outputted to the throttle actuator 25 for deceleration. Further, if necessary, a signal is outputted to the brake actuator 26 so as to apply brake pressure for deceleration. Thus, the actual inter-vehicle distance L is maintained at the safe inter-vehicle distance $L_s$ by changing engine power electrically or applying brakes automatically, if needed.

The operative or inoperative conditions of the constant speed running mode or those of the following-behind running mode is displayed on the displaying section 44. Similarly, the state of the released cruise control, the set vehicle speed $V_0$ and the like are also displayed thereon.

Further, the signal of the following-behind running mode is sent from the running mode judging section 42 to a set vehicle speed updating section 45 and an automatic restoring section 46, respectively.

The set vehicle speed updating section 45, in case of the following-behind running mode, times a duration $T_c$ of that mode and if the duration exceeds a specified time $T_1$, a new vehicle speed $V_r$ is calculated based on an average vehicle speed $V_n$ within a specified time and is inputted to the acceleration/deceleration control section 43, in which the set vehicle speed $V_0$ is updated into this new vehicle speed $V_r$.

Further, the automatic restoring section 46, when a brake is applied during the following-behind running mode, senses a brake pressure $P_b$ and compares the vehicle speed $V_1$ with a lower limit vehicle speed $V_L$ which is obtained by multiplying the vehicle speed $V_1$ by a specified coefficient β. If the vehicle speed $V_1$ is greater than the lower limit vehicle speed $V_L$, it is judged that the brake operation is caused by a driver's intention to transfer to the following-behind running mode early or to increase the inter-vehicle distance temporally and the cruise control, which has been once released due to the braking operation, is again restored to start operation. The specified coefficient β is a value smaller than 1, such as 0.7. The displaying section 44 displays the new vehicle speed $V_r$ or the state of the automatic restoration to the following-behind running mode.

Next, an operation of the cruise control system will be described.

As described before, the ADA system 20, when there is a hazardous condition such as a lane moving-out, a collision with a preceding vehicle, a contact with an obstacle and the like, issues an alarm by a warning device 24 or, if the driver takes no action to avoid such hazardous condition, the throttle actuator 25, the brake actuator 26 or the steering actuator 27 are operated so as to avoid hazard automatically.

Additionally, when the cruise control system 30 enters into the operating condition responsive to the ON operation of the main switch 31, the vehicle 1 is controlled in a constant speed running condition or a following-behind running condition in cooperation with the ADA system 20 without driver's operations such as an accelerator pedal operation and a braking operation.

A control process of the cruise control system 30 will be described with reference to a flowchart in FIG. 3.

When the main switch 31 is turned ON to start the cruise control system 30 and the ADA system 20 respectively, at a step S1, flags are initialized and then at a step S2 (hereinafter, referred to as just "S3", "S4" and so on), the ON/OFF condition of switching devices and the vehicle speed $V_1$ are read.

Next, at S3 the switching condition of the main switch 31 is checked. If the main switch is in the ON condition, the program goes to S4 and if it is in the OFF condition, the program ends.

At S4, it is judged whether the cruise control setting switch 100 is turned ON or not. If the switch is turned ON, the program goes to S5 where the running mode, namely, the constant speed running or the following-behind running, is established and if the switch is turned OFF, the program returns to S2.

Figure 4:
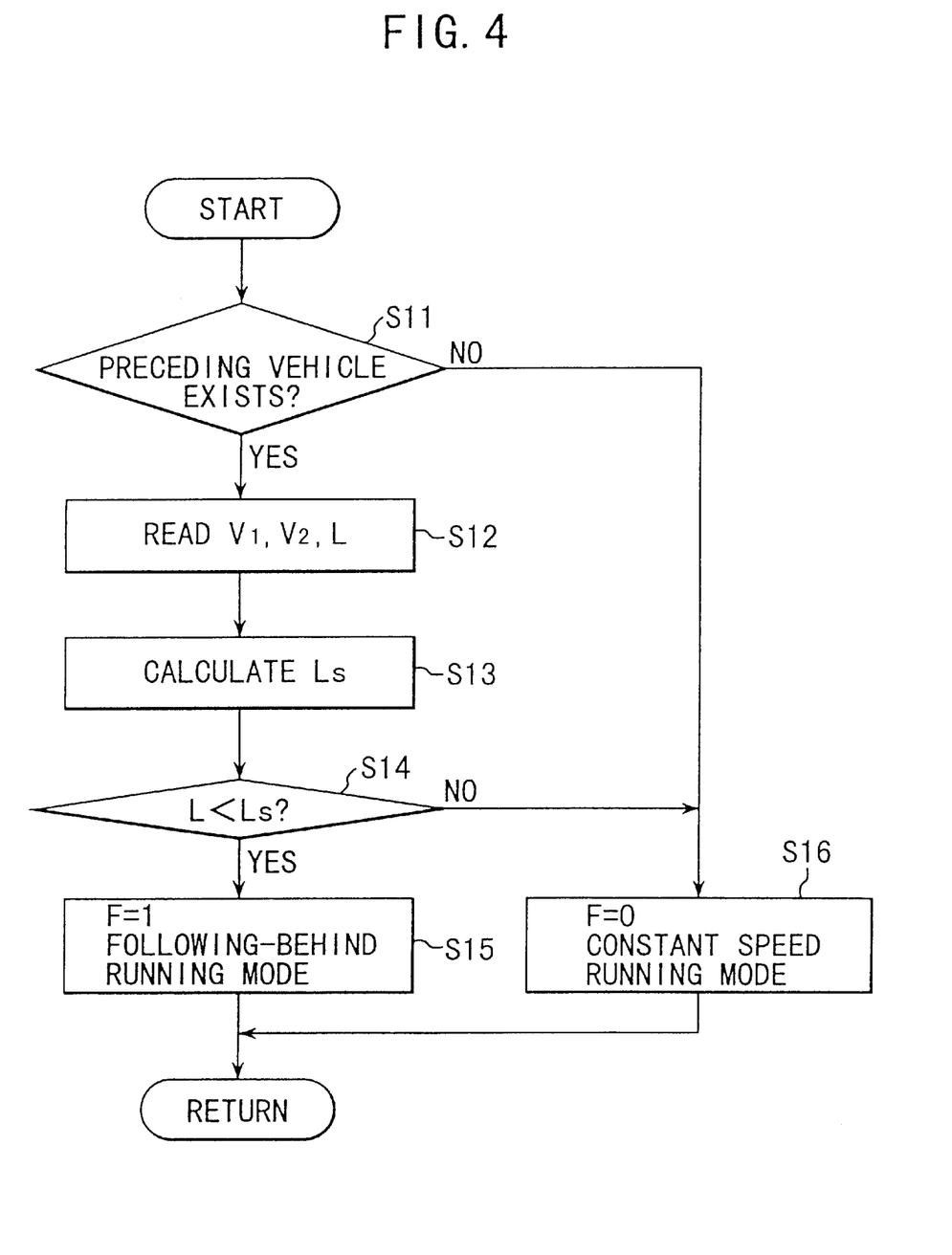
FIG. 4 is a flowchart of a subroutine for determining a running mode.

The establishment of the running mode is shown by a flowchart in FIG. 4. In the flowchart, at S11 it is judged whether or not a preceding vehicle exists, from the image data of the image recognition unit 22. If there is no preceding vehicle, the program skips to S16 where a flag F showing the running mode is set to "0" that means the constant speed running mode.

Next, if there exists a preceding vehicle, at S12 the vehicle speed $V_1$ of the self vehicle, the vehicle speed $V_2$ of the preceding vehicle and the actual inter-vehicle distance L are read. Then, at S13 the safe inter-vehicle distance $L_s$ is calculated according to the forgoing equation and at S14 the actual inter-vehicle distance L is compared with the safe inter-vehicle distance $L_s$.

Figure 8A:
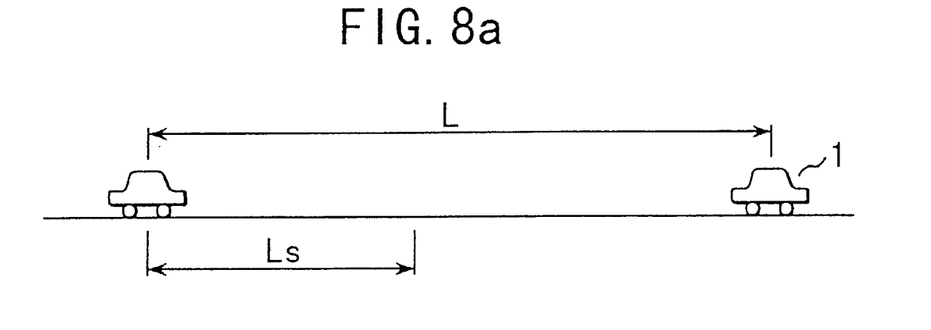
FIG. 8a is a schematic diagram showing a vehicle traveling in the constant speed running mode.
Figure 8B:
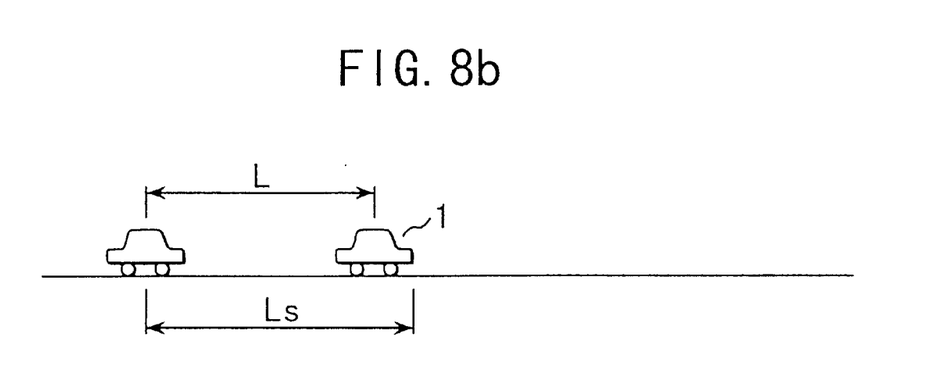
FIG. 8b is a schematic diagram showing a vehicle traveling in the following-behind running mode.

In case where the actual inter-vehicle distance L is smaller than the safe inter-vehicle distance $L_s$, as illustrated in FIG. 8b, the program goes to S15 where the flag F is set to "1" that means a following-behind running mode and in case where the actual inter-vehicle distance L is larger than the safe inter-vehicle distance $L_s$, as illustrated in FIG. 8a, the program goes to S16 where the flag F is set to "0" that means a constant speed running mode. Thus, the running mode is judged to be a constant speed running when the preceding vehicle travels far away and judged to be a following-behind running when the preceding vehicle travels nearby.

Next, at S6 the set vehicle speed $V_0$ is established. This set vehicle speed is updated, in case where the following-behind running mode lasts for a long time. This updating process will be described according to a flowchart shown in FIG. 5.

Figure 5:
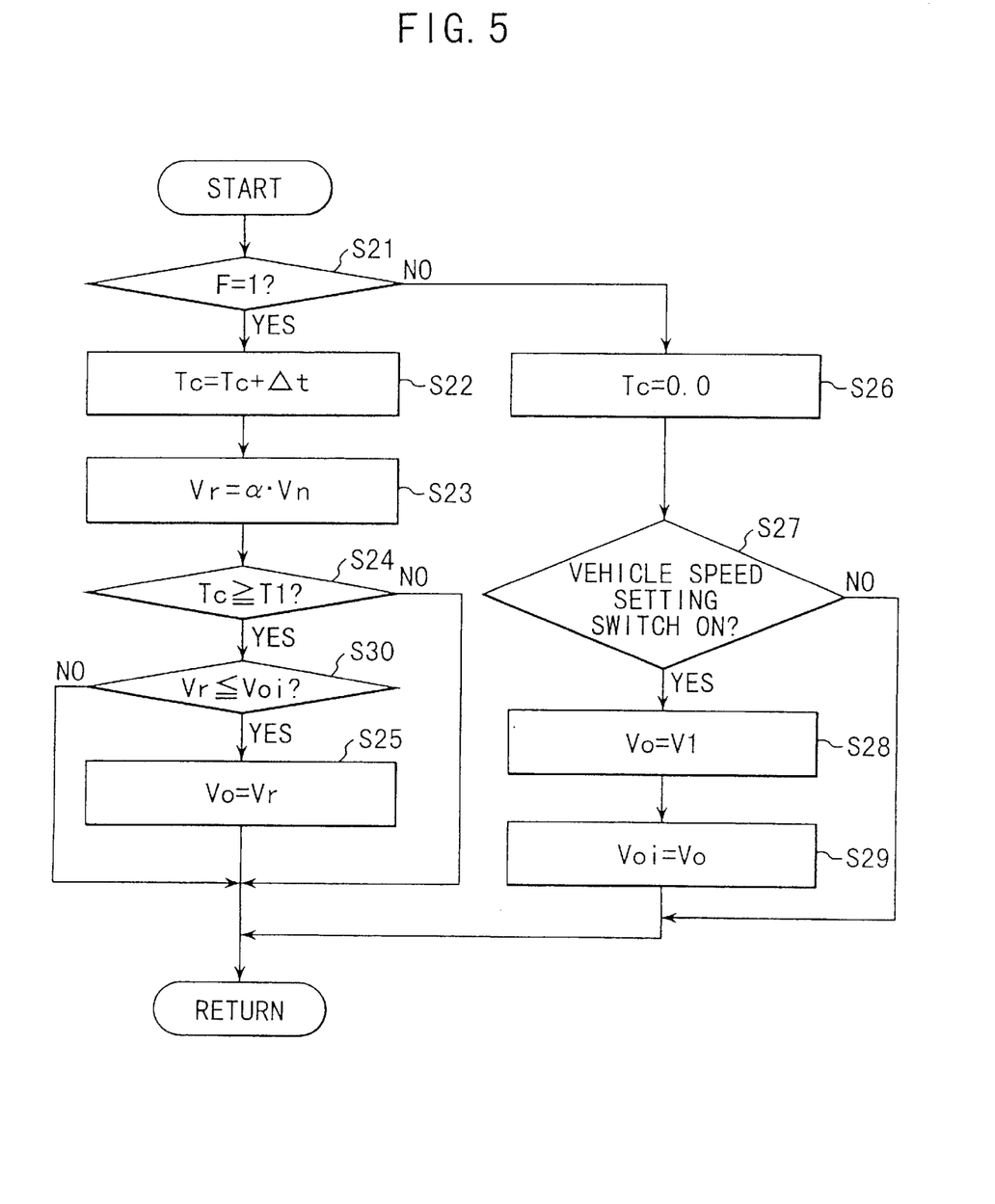
FIG. 5 is a flowchart showing a flow of control for establishing and updating a set vehicle speed.

First, at S21, the current running mode is checked. If F=1 (following-behind running), the program goes to S22 and if F=0 (constant speed running), the program goes to S26.

In case of the following-behind running mode, at S22 a duration $T_c$ since the start of the following-behind running mode, i.e., when F=1, is calculated at a time interval of Δt.

Then, the program goes to S23 where an average vehicle speed $V_n$ within a specified time is calculated and the average $V_n$ is multiplied by a coefficient α which is larger than 1, for example, 1.2, to obtain a new vehicle speed $V_r$ which is slightly larger than the average vehicle speed $V_n$.

Then, the program goes to S24 where it is judged whether or not the duration $T_c$ becomes larger than a predetermined time $T_1$. If $T_c \geq T_1$, the program goes to S30 and if $T_c < T_1$, the program leaves the routine, that is, the set vehicle speed $V_0$ is retained. Next, at S30, the new vehicle speed $V_r$ is compared with an initial target vehicle speed $V_{0i}$ (a vehicle speed initially set by the driver at a step S29 which will be described hereinafter). If $V_r$ is smaller than $V_{0i}$, the target vehicle speed $V_0$ is updated by the new vehicle speed $V_r$ at S25 and if $V_r$ is larger than $V_{0i}$, the set vehicle speed $V_0$ is retained as it is.

If it is judged that the vehicle is in the constant speed running mode, the program goes to S26 where the duration $T_c$ is cleared and then at S27 it is checked whether the vehicle speed setting switch is turned ON or OFF. If the switch is turned ON, at S28 the set vehicle speed $V_0$ is updated by the present vehicle speed $V_1$ and further at S29 the set vehicle speed $V_0$ is stored as an initial target vehicle speed $V_{0i}$. On the other hand, the switch is turned OFF, the program leaves the routine after storing $V_0$, that is, the previous set vehicle speed is retained.

Figure 3:
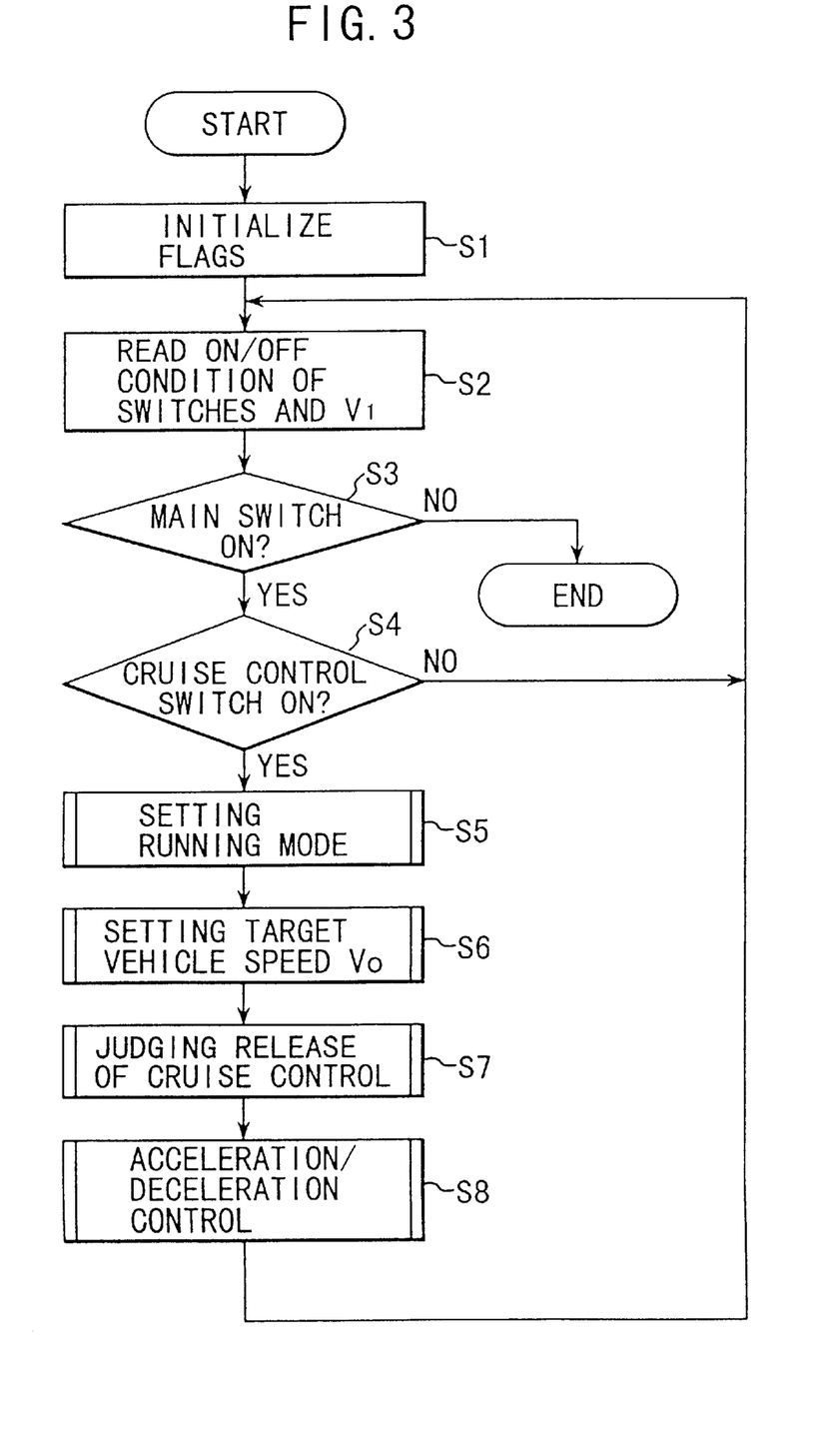
FIG. 3 is a flowchart showing a flow of control according to a cruise control system.

In the flowchart shown in FIG. 3, after the set vehicle speed $V_0$ is established as described above, the program goes to S7 where the cruise control is automatically restored. This restoring process will be described below according to a flowchart shown in FIG. 6.

Figure 6:
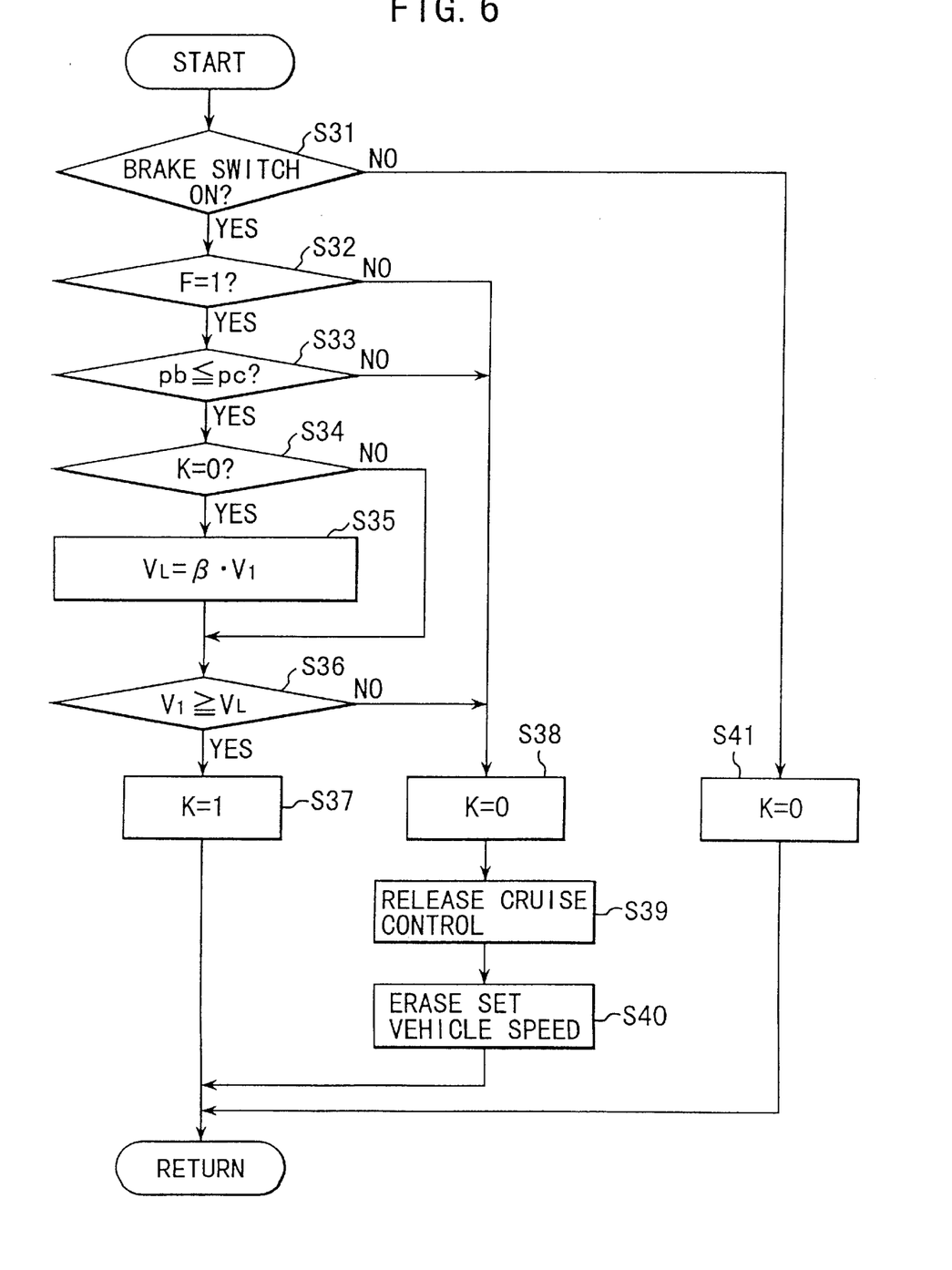
FIG. 6 is a flowchart showing a flow of control for releasing a cruise control when applying brakes.

In the flowchart as shown in FIG. 6, at S31 it is judged whether or not the brake switch 33 is turned ON. If the brake switch 33 is turned ON, the program goes to S32. If it is turned OFF, the program goes to S41 where a flag K which will be described hereinafter is set to 0 (K=0) and then the flow finishes.

At S32, it is judged whether or not the flag F indicating the running mode is equal to 1 (F=1; following-behind running mode). In case of F=0 (constant speed running mode), the program goes to S38 where K is set to 0 (K=0). After that, the program steps to S39 where the setting to the cruise control is released. Further, the program steps to S40 where the set vehicle speed is erased and then the program leaves the routine.

At S33, the brake pressure $P_b$ applied by the driver is compared with a predetermined brake pressure $P_c$. If $P_b \leq P_c$, the flow goes to S34. If $P_b > P_c$, that is, this case being regarded as an emergency brake, the flow skips to S38 where the cruise control is released (S39) and the set vehicle speed is erased (S40) and then the program leaves the routine.

When the program steps from S33 to S34, the flag K is checked to judge whether or not the braking operation has initially started. That is, if the flag K is equal to "0" that means an initial braking operation, the flow goes to S35 where a lower limit vehicle speed $V_L$ which is lower than the vehicle speed $V_1$ detected at the start of braking is established according to a formula $V_L = \beta \cdot V_1$. Herein, a coefficient $\beta$ is set to a value lower than 1, for instance, 0.7. If it is judged at S34 that K is "1" that means a braking operation after an initial one, then the program skips to S36 where the lower limit vehicle speed $V_L$ is established to be the vehicle speed $V_1$ detected at the start of braking.

Then, at S36 the vehicle speed $V_1$ during braking is compared with the lower limit vehicle speed $V_L$. If $V_1 \geq V_L$, the brake applied being regarded as a temporary braking operation, the program goes to S37 where K is set to 1 and after that the flow finishes. In this case, the cruise control is not released.

On the other hand, if $V_1 < V_L$, the braking operation being regarded as a normal one, the program goes to steps where the cruise control is released (S39) and the target vehicle speed is erased (S40) and the program leaves the routine.

As described above, when the driver applies a brake during the following-behind running, in a case where the brake pressure is low or the deceleration is small, this is judged to be a temporary light braking operation and the cruise control is suspended until a braking operation as will be described hereinafter is finished. Further, when the braking operation is finished, the cruise control is automatically restored and the vehicle return s to the following-behind running.

In the flowchart shown in FIG. 3, after the release control of the cruise control system is performed during the braking operation, the program goes to S8 where the acceleration/deceleration control is performed. This acceleration/deceleration control will be described below according to a flowchart shown in FIG. 7.

Figure 7:
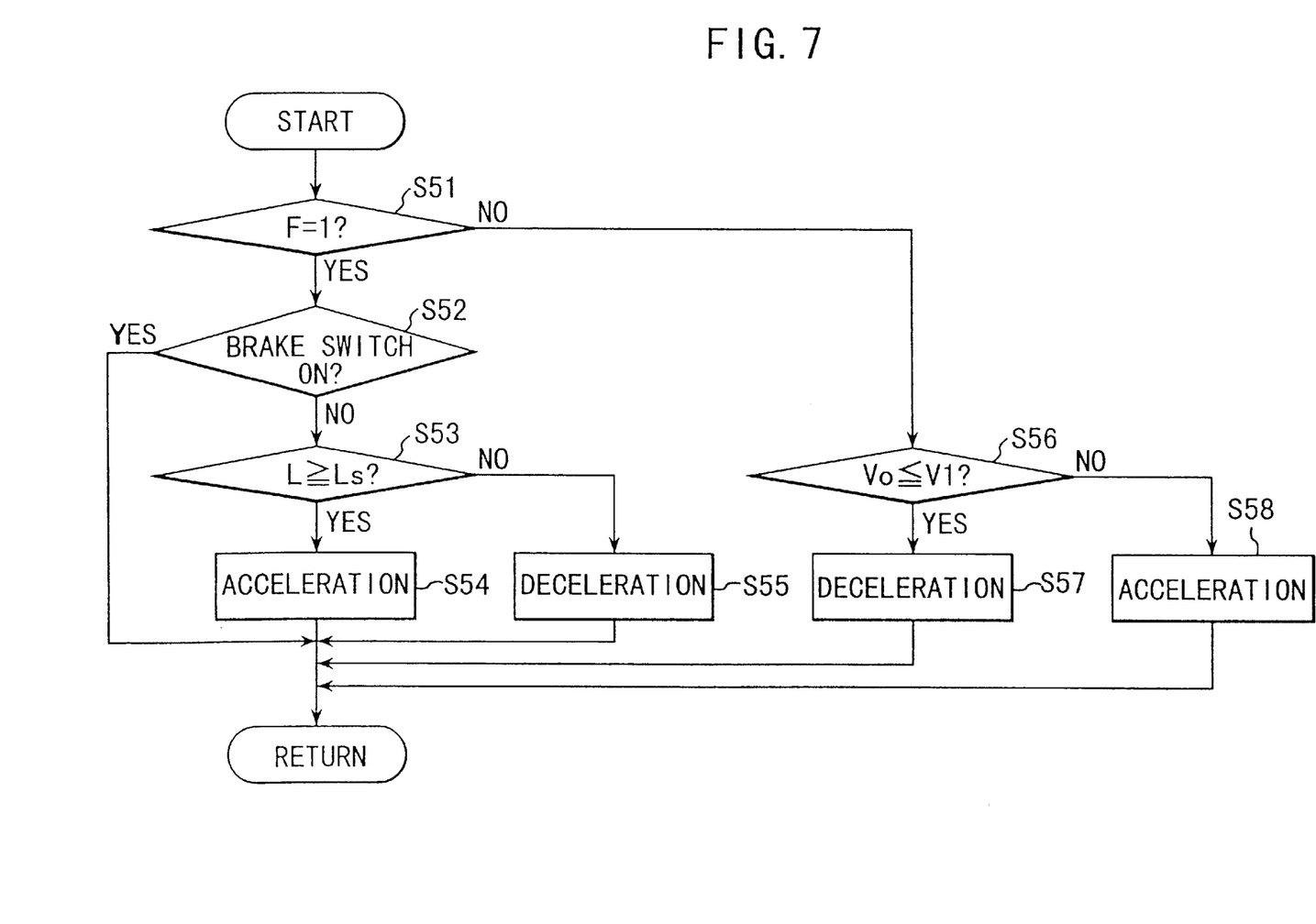
FIG. 7 is a flowchart of a subroutine for controlling a vehicle speed during the following-behind running mode.

First, at S51, it is judged whether the flag F is 1 or 0. If F=1 (following-behind running mode), the flow steps to S52 where it is judged whether the brakes witch 33 is turned ON or OFF. If the brake switch 33 is turned ON, the program leaves the routine.

On the other hand, if the brake switch 33 is turned OFF, the program goes to S53 where the inter-vehicle distance L is compared with the safe inter-vehicle distance $L_s$. In case of $L \geq L_s$, the program steps to S54 where a signal for in creasing the opening angle of the throttle valve 3 is outputted to the throttle actuator 25 so as to accelerate the vehicle 1 and in case of $L < L_s$, the program steps to S55 where a signal for decreasing the opening angle of the throttle valve 3 is outputted to the throttle actuator 25 so as to decelerate the vehicle 1 and at the same time, if required, a signal for applying brake pressure is outputted to the brake actuator 26 so as to reduce the vehicle speed. Thus, the vehicle 1 can perform a following-behind running while a safe inter-vehicle distance is retained.

Further, if it is judged at S51 that the flag F is 0 (constant speed running mode), the program goes to S56 where the set vehicle speed $V_0$ is compared with the vehicle speed $V_1$. If $V_0 > V_1$, the program goes to S58 where a signal for increasing the opening angle of the throttle valve 3 is outputted to the throttle actuator 25 so as to accelerate the vehicle 1 and if $V_0 \leq V_1$, a signal for decreasing the opening angle of the throttle valve 3 is outputted to the throttle actuator 25 so as to decelerate the vehicle 1 and at the same time, if required, a signal for applying brake pressure is outputted to the brake actuator 26 so as to reduce the vehicle speed, thereby the vehicle 1 can perform a constant speed running.

In summary, the cruise control system incorporating the functions of the constant speed running and the following-behind running provides a practicable vehicle control free from an unnecessary automatic release and an abrupt acceleration.

While the presently preferred embodiment of the present invention has been shown and described, it is to be understood that this disclosure is for the purpose of illustration and that various changes and modifications may be made without departing from the scope of the invention as set forth in the appended claim.

What is claimed is:

1. A cruise control system of a vehicle having a first vehicle speed detecting means for detecting a first vehicle speed of said vehicle, an inter-vehicle distance detecting means for detecting an inter-vehicle distance between said vehicle and a preceding vehicle traveling ahead of said vehicle, a second vehicle speed detecting means for detecting a second vehicle speed of said preceding vehicle and an acceleration/deceleration means for accelerating or decelerating said vehicle, comprising:

a safe inter-vehicle distance calculating means for calculating a safe inter-vehicle distance based on said first vehicle speed and said second vehicle speed;

a constant speed running mode selecting means for selecting a constant speed running mode wherein said first vehicle speed of said vehicle is held at a set vehicle speed by said acceleration/deceleration means, when said inter-vehicle distance is larger than said safe inter-vehicle distance;

a following-behind running mode selecting means for selecting a following-behind running mode wherein said inter-vehicle distance is held at a predetermined value by said acceleration/deceleration means, when said inter-vehicle distance is smaller than said safe inter-vehicle distance; and a vehicle speed updating means, when said following-behind running mode lasts longer than a specified time, for updating said set vehicle speed into a vehicle speed around an average vehicle speed within said specified time.

2. The cruise control system according to claim 1, wherein when said following-behind running mode lasts for said specified time, said set vehicle speed is updated by a vehicle speed higher than said average vehicle speed.

3. The cruise control system according to claim 1, wherein said inter-vehicle distance is detected by processing image signals taken by cameras.

4. The cruise control system according to claim 1, wherein said predetermined value is equal to said safe inter-vehicle distance.

5. A cruise control system of a vehicle having a first vehicle speed detecting means for detecting a first vehicle speed of said vehicle, an inter-vehicle distance detecting means for detecting an inter-vehicle distance between said vehicle and a preceding vehicle traveling ahead of said vehicle, a second vehicle speed detecting means for detecting a second vehicle speed of said preceding vehicle, a braking operation detecting means when a braking operation is performed for detecting said braking operation, a brake pressure detecting means for detecting a brake pressure and an acceleration/deceleration means for accelerating or decelerating said vehicle, comprising:

a safe inter-vehicle distance calculating means for calculating a safe inter-vehicle distance based on said first vehicle speed and said second vehicle speed;

a constant speed running mode selecting means for selecting a constant speed running mode wherein said vehicle speed of said vehicle is held at a set vehicle speed by said acceleration/deceleration means, when said inter-vehicle distance is larger than said safe inter-vehicle distance;

a following-behind running mode selecting means for selecting a following-behind running mode wherein said inter-vehicle distance is held at a predetermined value by said acceleration/deceleration means, when said inter-vehicle distance is smaller than said safe inter-vehicle distance; and a cruise control restoring means, when said braking operation is finished, for restoring an operation of said cruise control system stopped by said braking operation during running at said following-behind running mode, when said brake pressure is lower than a specified value and when said first vehicle speed is higher than a lower limit vehicle speed.

6. The cruise control system according to claim 5, wherein said lower limit vehicle speed is established to be lower than said first vehicle speed when said braking operation starts.

7. The cruise control system according to claim 5, wherein said inter-vehicle distance is detected by processing image signals taken by cameras.

8. The cruise control system according to claim 5, wherein said predetermined value is equal to said safe inter-vehicle distance.

9. A cruise control system of a vehicle having first vehicle speed detecting means for detecting a first vehicle speed of said vehicle, inter-vehicle distance detecting means for detecting an inter-vehicle distance between said vehicle and a preceding vehicle traveling ahead of said vehicle, second vehicle speed detecting means for detecting a second vehicle speed of said preceding vehicle and acceleration/deceleration means for accelerating or decelerating said vehicle, comprising:

safe inter-vehicle distance calculating means for calculating a safe inter-vehicle distance based on said first vehicle speed and said second vehicle speed;

running mode judging means for judging a running mode of said vehicle;

constant speed running mode selecting means for selecting a constant speed running mode wherein said first vehicle speed of said vehicle is held at a set vehicle speed by said acceleration/deceleration means based on a result of said running mode judging means when said inter-vehicle distance is larger than said safe inter-vehicle distance;

following-behind running mode selecting means for selecting a following-behind running mode wherein said inter-vehicle distance is held at a predetermined value by said acceleration/deceleration means based on a result of said running mode judging means when said inter-vehicle distance is smaller than said safe inter-vehicle distance; and vehicle speed updating means, when said following behind running mode lasts longer than a specified time, for updating said set vehicle speed into a vehicle speed around an average vehicle speed within said specified time.

10. A cruise control system of a vehicle having first vehicle speed detecting means for detecting a first vehicle speed of said vehicle, inter-vehicle distance detecting means for detecting an inter-vehicle distance between said vehicle and a preceding vehicle traveling ahead of said vehicle, second vehicle speed detecting means for detecting a second vehicle speed of said preceding vehicle, braking operation detecting means when a braking operation is performed for detecting said braking operation, brake pressure detecting means for detecting a brake pressure and acceleration/deceleration means for accelerating or decelerating said vehicle, comprising:

safe inter-vehicle distance calculating means for calculating a safe inter-vehicle distance based on said first vehicle speed and said second vehicle speed;

running mode judging means for judging a running mode of said vehicle;

constant speed running mode selecting means for selecting a constant speed running mode wherein said vehicle speed of said vehicle is held at a set vehicle speed by said acceleration/deceleration means based on a result of said running mode judging means, when said inter-vehicle distance is larger than said safe inter-vehicle distance;

following-behind running mode selecting means for selecting a following-behind running mode wherein said inter-vehicle distance is held at a predetermined value by to said acceleration/deceleration means based on a result of said running mode judging means when said inter-vehicle distance is smaller than said safe inter-vehicle distance; and cruise control restoring means, when said braking operation is finished, for restoring an operation of said cruise control system stopped by said braking operation during running at said following-behind running mode, when said brake pressure is lower than a specified value and when said first vehicle speed is higher than a lower limit vehicle speed.

11. A cruise control system (30) of a vehicle (1) having first vehicle speed detecting means (34) mounted on said vehicle (1) for detecting a first vehicle speed (V1) thereof and for generating a first vehicle speed signal, image recognition means (22) with a pair of CCD cameras (21,21) mounted on said vehicle (1) for calculating an inter-vehicle distance (L) between said vehicle (1) and a preceding vehicle traveling ahead of said vehicle (1) by taking a stereoscopic image of said second vehicle and for generating a second vehicle speed signal and acceleration/deceleration means (25,3) for accelerating or decelerating said vehicle (1), comprising:

safe inter-vehicle distance calculating means (41) responsive to said first and second vehicle speed signals for calculating a safe inter-vehicle distance (Ls) and for producing a safe inter-vehicle distance signal;

constant speed running mode selecting means (42) responsive to said safe inter-vehicle distance signal and said second vehicle speed signal for selecting a constant speed running mode wherein said first vehicle speed (V) of said vehicle (1) is held at a set vehicle speed (VO) by said acceleration/deceleration means when said inter-vehicle distance (L) is larger than said safe inter-vehicle distance (Ls) and for generating a constant speed signal;

following-behind running mode selecting means (42') responsive to said constant speed signal and said first vehicle signal for selecting a following-behind running mode when said inter-vehicle distance (L) is smaller than said safe inter-vehicle distance (Ls);

vehicle speed updating means (45) responsive to said constant speed signal and said first vehicle speed signal for updating said set vehicle speed (VO) to a higher value when said following-behind running mode lasts for a specified time and for outputting an updating signal so as to run faster than ever within a predetermined safety speed; and vehicle running control means (43) responsive to said first and second vehicle speed signals, said constant speed signal, said safe inter-vehicle distance signal, and said updating signal for controlling said acceleration/deceleration means (25,3) in an optimum running mode for each driving condition so as to avoid an unnecessary ON and OFF operation of said cruise control system (30) and frequent accelerations and decelerations of said vehicle (1) due to intentional changes by said driver.

12. The cruise control system (30) according to claim 11, wherein:

said set vehicle speed is renewed to a higher value than an averaged vehicle speed within a predetermined time when said following-behind running mode lasts for a predetermined elapsed time.

13. A cruise control system (30) of a vehicle (1) having, first vehicle speed detecting means (34) mounted on said vehicle (1) for detecting a first vehicle speed (V1) thereof and for generating a first vehicle speed signal, image recognition means (22) with a pair of CCD cameras (21,21) mounted on said vehicle (1) for calculating an inter-vehicle distance (L) between said vehicle (1) and a preceding vehicle traveling ahead of said vehicle by taking a stereoscopic image of a second vehicle preceding said vehicle (1) and for generating a second vehicle speed signal, a main switch (31) for starting an engine (2) of said vehicle (1) and for generating a main switch signal when said engine (2) is started to run, a cruise control switch (100) for setting a cruising speed of said vehicle (1) and for outputting a cruising speed signal, a vehicle speed setting switch (32) for setting a vehicle speed and for outputting a vehicle speed setting signal, a brake switch (33) for outputting a brake signal when a driver steps on a brake pedal (13), a brake pressure switch (35) provided in a brake system (12) for detecting a brake pressure (Pb) therein and for producing a brake pressure signal, and vehicle driving control means (25,26,3) for controlling said vehicle (1) in an optimum condition for each driving condition, comprising:

safe inter-vehicle distance calculating means (41) responsive to said first and second vehicle speed signals for calculating a safe inter-vehicle distance (Ls) and for producing a safe inter-vehicle distance signal;

running mode judging means (42) responsive to said safe inter-vehicle distance signal, said second vehicle speed signal, said main switch signal, said cruising speed signal, said vehicle speed setting signal and said brake signal for judging conditions whether there is an existence of said second vehicle or whether said inter-vehicle distance is more than a predetermined safe distance and for producing a judgement signal when either one of said conditions is satisfied;

following-behind running mode selecting means (42') responsive to said judgement signal, said brake switch signal, said first vehicle speed signal and said brake pressure signal for selecting a following-behind running mode when said inter-vehicle distance (L) is smaller than said safe inter-vehicle distance (Ls) and for generating a mode signal;

automatic cruise control restoring means (46) responsive to said mode signal, said brake signal, said first vehicle speed signal and said brake pressure signal for restoring a cruise control mode switched off by a brake operation in case of not only wherein said brake pressure (Pb) is lower than a predetermined pressure value but also wherein said vehicle speed (V1) is lower than a predetermined lower speed when said brake pedal (13) is released; and vehicle running control means (43) responsive to said first and second vehicle speed signals, said constant speed signal, said safe inter-vehicle distance signal, and said vehicle speed setting signal, for controlling said vehicle driving control means (25,26,3) in an optimum running mode for each driving condition so as to avoid an unnecessary ON and OFF operation of said cruise control system (30) and frequent accelerations and decelerations of said vehicle (1) due to intentional changes by said driver.

14. A cruise control method of a vehicle (1) having first vehicle speed detecting means (34) mounted on said vehicle (1) for detecting a first vehicle speed (V1) thereof, image recognition means (22) with a pair of CCD cameras (21,12) mounted on said vehicle (1) for calculating an inter-vehicle distance (L) between said vehicle (1) and a preceding vehicle traveling ahead of said vehicle (1) by taking a stereoscopic image of said second vehicle, and acceleration/deceleration means (25,3) for accelerating or decelerating said vehicle (1), comprising the steps of:

calculating a safe inter-vehicle distance (Ls) from said inter-vehicle distance (L);

selecting a constant speed running mode where said first vehicle speed (V1) of said vehicle (1) is held at a set vehicle speed (VO) by said acceleration/deceleration means when said inter-vehicle distance is larger than said safe inter-vehicle distance (Ls);

selecting a following-behind running mode when said inter-vehicle distance (L) is smaller than said safe inter-vehicle distance (Ls);

updating said set vehicle speed (VO) to a higher value when said following-behind running mode lasts for a specified time so as to run faster than ever within a predetermined safety speed; and controlling said acceleration/deceleration means (25,3) in an optimum running mode for each driving condition so as to avoid an unnecessary ON and OFF operation of said cruise control system (30) and frequent accelerations and decelerations of said vehicle (1) due to intentional changes by said driver.

15. A cruise control method of a vehicle (1) having first vehicle speed detecting means (34) mounted on said vehicle (1) for detecting a first vehicle speed (V1) thereof, image recognition means (22) with a pair of CCD cameras (21,21) mounted on said vehicle (1) for calculating an inter-vehicle distance (L) between said vehicle (1) and a preceding vehicle traveling ahead of said vehicle by taking a stereoscopic image of a second vehicle preceding said vehicle (1), a main switch (31) for starting an engine (2) of said vehicle (1), a cruise control switch (100) for setting a cruising speed of said vehicle (1), a vehicle speed setting switch (32) for setting a vehicle speed, a brake switch (33) for outputting a brake signal when a driver steps on a brake pedal (13) of the vehicle, a brake pressure switch (35) provided in a brake system (12) for detecting a brake pressure (Pb) therein and for producing a brake pressure signal, and vehicle driving control means (25,26,3) for controlling said vehicle (1) in an optimum condition for each driving condition, comprising the steps of:

calculating a safe inter-vehicle distance (Ls) from said inter-vehicle distance (L);

judging whether there is an existence of said second vehicle or whether said inter-vehicle distance is more than a predetermined safe distance;

selecting a following-behind running mode when said inter-vehicle distance (L) is smaller than said safe inter-vehicle distance (Ls);

restoring a cruise control mode switched off by a brake operation in case of not only wherein said brake pressure (Pb) is lower than a predetermined pressure value but also wherein said vehicle speed (V1) is lower than a predetermined lower speed when said brake pedal (13) is released; and controlling said vehicle driving control means (25, 26,3) in an optimum running mode for each driving condition so as to avoid an unnecessary ON and OFF operation of said cruise control system (30) and frequent acceleration and deceleration of said vehicle (1) due to intentional changes by said driver.

* * * * *